(No Model.)
W. S. BACON & S. L. HOLSINGER.
NOZZLE SPRAYER.
No. 441,048. Patented Nov. 18, 1890.
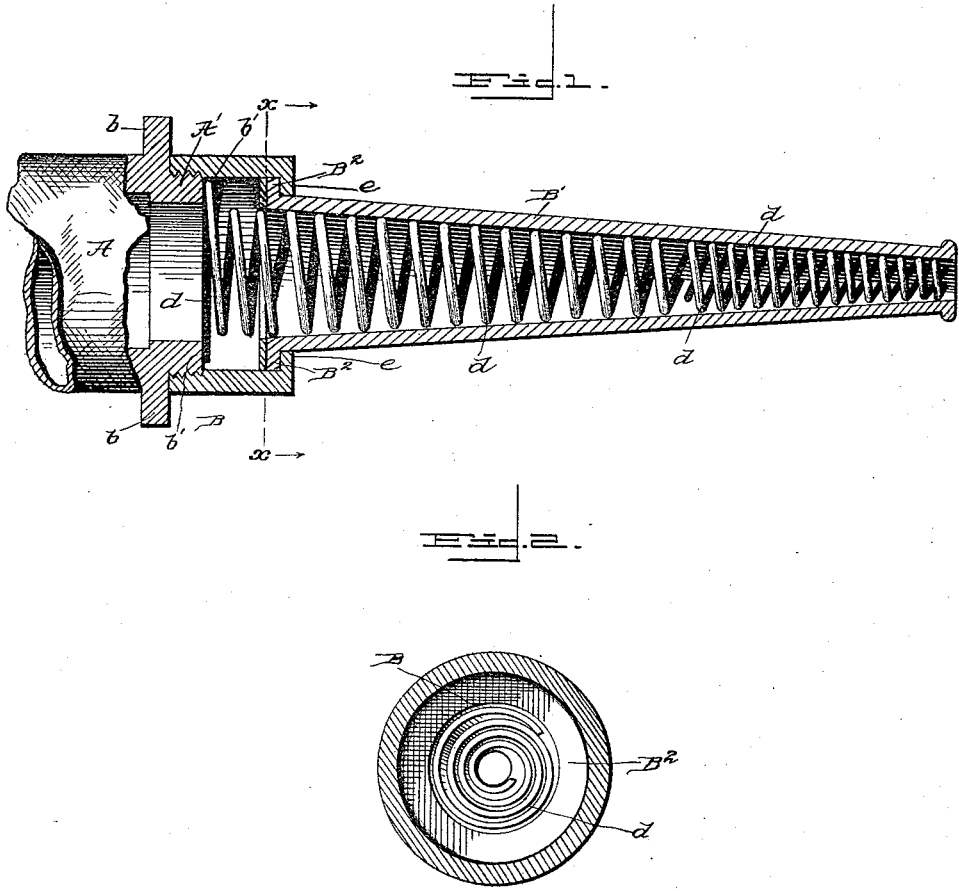
WITNESSES
INVETOR
William S. Bacon
Samuel L. Holsinger
By Myers & Co Attorneys

UNITED STATES PATENT OFFICE.

WILLIAM S. BACON AND SAMUEL L. HOLSINGER, OF TIFFIN, OHIO.

NOZZLE-SPRAYER.

SPECIFICATION forming part of Letters Patent No. 441,048, dated November 18, 1890.

Application filed September 20, 1889. Serial No. 324,492. (No model.)

*To all whom it may concern:*

Be it known that we, WILLIAM S. BACON and SAMUEL L. HOLSINGER, citizens of the United States of America, residing at Tiffin, in the county of Seneca and State of Ohio, have invented certain new and useful Improvements in Nozzle-Sprayers, of which the following is a specification, reference being had therein to the accompanying drawings.

Our invention pertains to improved mechanism for spraying fluid, and it is especially adapted to be applied to the nozzles of hose-pipes for spraying lawns, flowers, &c.; and it consists in the peculiar construction and arrangement of parts, substantially as hereinafter more fully shown and described.

In the accompanying drawings, Figure 1 is a sectional elevation of our invention. Fig. 2 is a cross-section thereof, taken through the line *x x*.

In constructing our sprayer we provide upon the outer periphery of hose-cylinder A suitable corrugations, (over which the hose is slipped and secured in any ordinary manner,) and also with an external flange *b*. The end *b'* of the extensions A' of the cylinder A is designed as an abutment or barrier for the larger end of a spiral spring *d* disposed in sleeve B, screwed upon the screw-thread of extension A' of the cylinder.

B' is a conical or tapering nozzle provided at its inner larger end with a flange B², fitting within the sleeve B and against the flange *e* at the outer end of the sleeve.

The inner periphery of nozzle B' is tapering or conical for reception of the spiral springs *d*, conformed thereto, as shown.

By manipulating or turning in the required direction the sleeve B, even when but one of the spiral springs is used, the interstices between its convolutions may be diminished or enlarged, as desired, for rendering finer or coarser the spray projected from the nozzle, but using two or more of said spiral springs, the convolutions of one spring being interposed between the convolutions of a second spring, &c., the spray may be rendered still finer and more mist-like. Thus constructed a highly efficient, simple, and inexpensive sprayer-nozzle is produced for the purpose contemplated.

Having thus fully described our invention, what we claim, and desire to secure by Letters Patent, is—

1. The sprayer-nozzle combining the tapering or conical nozzle, the springs arranged within and conforming to the interior of said nozzle, the hose-attaching cylinder, and the sleeve connecting said nozzle to said cylinder, said springs abutting against the said cylinder, substantially as set forth.

2. In a sprayer-nozzle, the combination of the conical or tapering nozzle having at its larger end a flange, the springs conforming to and arranged within said nozzle, the cylinder for connection to the hose and having an inner screw-threaded extension, and the internally screw-threaded sleeve engaging said extension and having a flange at its outer end engaging the flange on the enlarged end of said nozzle, said springs exerting pressure against the end of said extension, substantially as specified.

In testimony whereof we affix our signatures in presence of two witnesses.

WILLIAM S. BACON.
    SAMUEL L. HOLSINGER.

Witnesses:
 ROBERT LYSLE,
 ALFRED SCHLOSSER.